Aug. 2, 1938.  L. SHUMAN  2,125,589
SANDWICH COOKER
Filed May 7, 1937
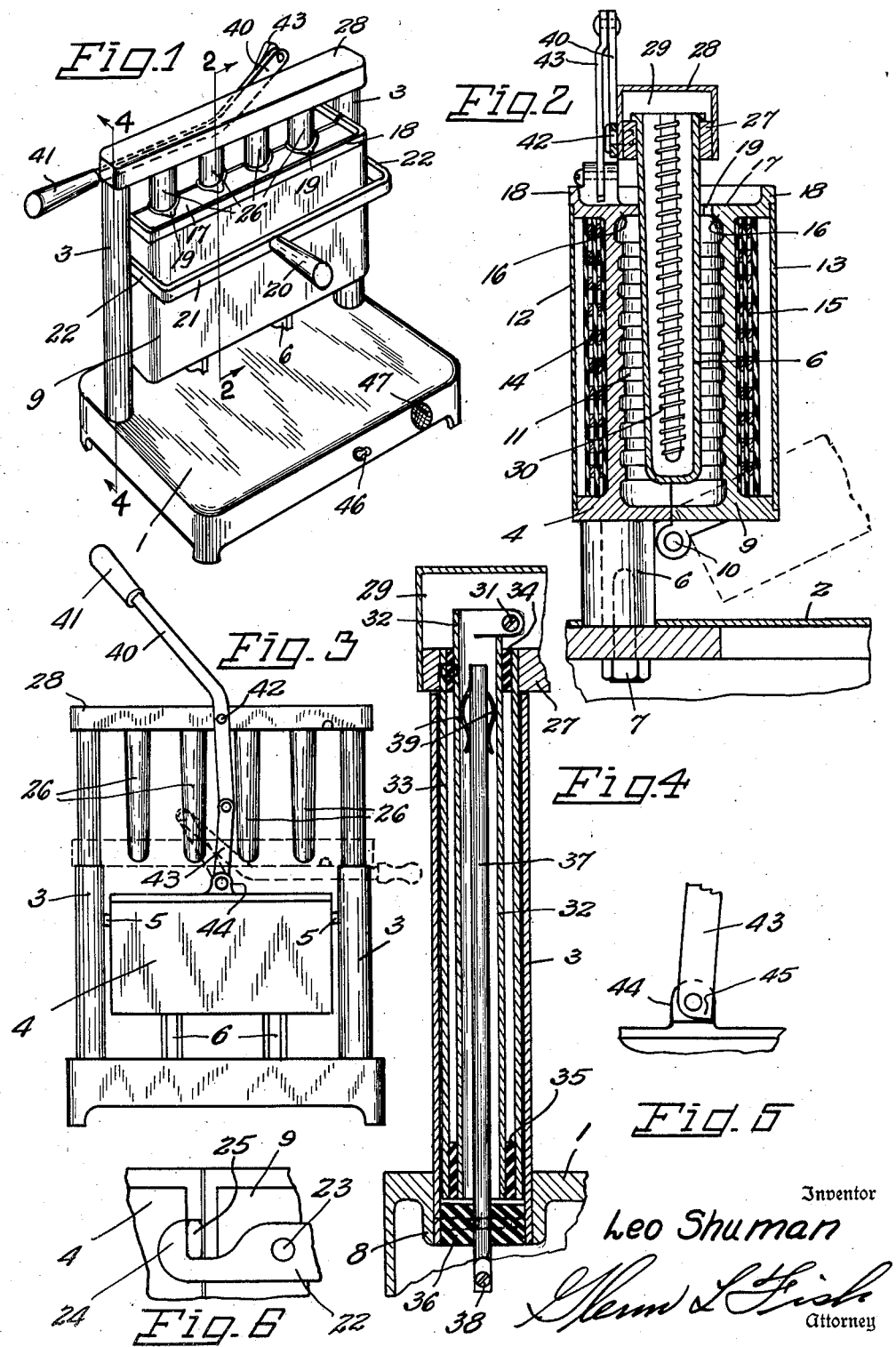
Inventor
Leo Shuman
Attorney Patented Aug. 2, 1938

2,125,589

UNITED STATES PATENT OFFICE 2,125,589

SANDWICH COOKER

Leo Shuman, Spokane, Wash., assignor to Ellsworth A. Shuman, Spokane, Wash.

Application May 7, 1937, Serial No. 141,356

9 Claims. (Cl. 219—19)

This invention relates to a sandwich cooker, and one object of the invention is to provide an electrically energized cooker of such construction that dough such as used for making waffles can be cooked and an elongated shell formed which has a longitudinally extending pocket open at one end in order that a sausage, hamburger-roll or the like may be placed in the pocket as a filler and the cooker shell and filler eaten as a sandwich.

Another object of the invention is to provide a cooker wherein the body portion consists of companion sections formed with registering recesses to provide chambers wherein the dough is cooked, cores being provided for extending into the chambers in spaced relation to walls thereof so that the dough when cooked will form elongated shells of the desired configuration.

Another object of the invention is to so mount the stationary section and the movable section of the body that the movable section may be swung downwardly to a reclining position for filling of its recesses with dough and then swung to a raised or closed position and the cores moved into the chambers to shape the dough while cooking the same.

Another object of the invention is to provide a cooker wherein the chambers are disposed vertically during a cooking operation so that steam may escape from their upper ends and thus prevent steam from accumulating in the chambers and causing the cooked shells to be soggy instead of crisp.

Another object of the invention is to provide improved means for shifting the movable section of the body from one position to another and firmly but releasably securing this movable section in its raised position.

Another object of the invention is to provide improved means for mounting the cores and improved means for shifting the cores into and out of the chambers of the body and preventing premature or accidental downward movement of the cores into the chambers.

The invention is illustrated in the accompanying drawing, wherein

Figure 1 is a perspective view of the sandwich cooker.

Figure 2 is a sectional view taken vertically through the cooker along the line 2—2 of Figure 1.

Figure 3 is a view in elevation looking at the back of the cooker.

Figure 4 is a sectional view upon an enlarged scale taken vertically through a post of the cooker along the line 4—4 of Figure 1.

Figure 5 is a fragmentary view illustrating the manner in which the cores are maintained in a raised position.

Figure 6 is a fragmentary view illustrating the manner in which the movable section is maintained in its raised or closed position.

This improved sandwich cooker has a base 1 which is formed of strong metal and covered by a facing 2 of nickel or the like which imparts an attractive appearance to it and prevents damage by rust. Tubular posts 3 rise from rear corner portions of the base and between these posts is disposed the stationary section 4 of the body portion of the cooker. This section is anchored to the posts by side extensions or webs 5 and at its bottom is provided with supports 6 having threaded sockets to receive screws 7 passed upwardly through the base. Lower portions of the posts 3 are seated in sockets 8 formed through the base, as shown in Figure 4.

The movable section 9 of the body is hinged along its lower edge to the lower edge portion of the stationary section, as shown at 10, for movement from a lowered or opened position to a raised or closed position. Faces of the two sections which confront each other when the movable section is in the closed position are formed with recesses which register to provide chambers 11 in which dough is to be cooked. Walls of the recesses may be formed with ribs, as shown in Figure 2, to impart an ornamental design to the sandwich shell cooked in the chambers or the walls may be smooth. Upper and lower marginal portions of the two sections are extended as shown in Figure 2 and to these marginal portions are secured facing sheets 12 and 13 which are formed of nickel or the like and not only impart an attractive appearance to the cooker but also serve to enclose and shield heating coils 14 and 15 by means of which the two sections of the body are heated. A circuit for these coils is provided but not illustrated as any conventional circuit may be used. The chambers which are formed when the movable section is in a closed position are open at their upper ends and surrounded by marginal lips or flanges 16 which form portions of the bottom of a cup 17 defined by flanges 18 formed about upper ends of the two sections. The flanges 16 of the movable sections are formed with notches 19 serving as steam outlet ports when the cooker is in use. It will thus be seen that steam will be permitted to escape from the chambers and the dough when cooked will be crisp instead of having soggy portions as would be the case if the sections of the body extended horizontally and adequate provision for escape of steam were not provided.

The movable section must be firmly secured when in the closed position, and in order to do so and also provide means for easily swinging the movable section to a lowered or raised position, there has been provided a handle 20 projecting forwardly from a yoke 21 which may be referred to as forks and has its arms 22 pivoted to sides of the movable section as shown at 23. The arms 22 extend beyond the pivot pins 23 and are formed with hooks 24 for engaging lugs 25 projecting from opposite sides of the stationary section, and from an inspection of Figure 6 it will be seen that when the hooks are engaged with the lugs the movable section will be firmly but releasably held in the closed position. When the movable section is to be lowered, the handle 20 is grasped and swung upwardly to move the hooks out of engagement with the lugs, after which the handle is swung forwardly and downwardly to lower the movable section to a horizontal position in which dough can be poured into the recesses of the movable section or cooked shells removed. The movable section is then returned to the vertical position and secured and the cores 26 moved into the chambers to spread the dough and cause it to fill the chambers about the cores. It will be readily seen from an inspection of Figure 2 that when the dough is cooked it will form a shell of an elongated tubular or cylindrical formation having an axially extending pocket in which a sausage, hamburger-roll, or other desired filling may be placed and the filled shell eaten as a sandwich.

The cores 26 are of a hollow formation and carried by a cross bar 27 which is formed of strong metal and carries a hood 28 formed of nickel or the like and enclosing a space 29 through which wires extend to supply current to the heating units 30, one of which extends longitudinally in each core. The cores fit snugly in the open upper ends of the chambers 11 but if any dough should force its way upwardly through space between the cores and the flanges surrounding the same it will be caught in the trough or pan 17 and prevented from running down sides of the body. The wires which supply current to the heating units 30 extend longitudinally in the space 29 and at each end of the cross bar are secured to terminals 31 carried at upper ends of sleeves 32. One of the tubes has been illustrated in detail in Figure 4 and referring to this figure it will be seen that each tube extends longitudinally through a companion arm 33 carried by and depending from the cross bar 27. The arms 33 fit snugly within the posts 3 in telescoping engagement therewith and each tube is held in insulated relation to the arm through which it extends by upper and lower rings 34 and 35 of insulating material. A plug 36 which is also formed of insulating material fits into the lower end of the post 3 and through this plug is mounted a rod 37 having a terminal screw 38 at its lower end for engagement by a conductor wire of the energizing circuit for the cores and adjacent its upper end carrying resilient contact strips 39 which bear against the inner surface of the sleeve 32. It will thus be seen that while the cross bar may be shifted vertically to move the cores into and out of the chambers, the circuit for energizing the heating elements of the cores will not be broken.

While four cores and a corresponding number of chambers have been shown, it will be obvious that one or any other desired number may be provided.

In order to shift the cross bar vertically, there has been provided a lever 40 having a hand hold or handle 41 at one end and intermediate its length being pivoted to the cross bar, as shown at 42. The lever is bent at the point of pivotal mounting and the opposite end of the lever from the handle is pivoted to the upper end of a link 43 which has its lower end pivoted to an ear 44 carried by and extending upwardly from the upper edge of the stationary section of the body at the back thereof. By grasping the lever and swinging the free end thereof upwardly from the position shown in Figure 1 to that of Figure 3, the cross bar will be shifted upwardly to draw the cores out of the chambers. At its lower end the link is shaped to provide a tooth 45 having an arcuate edge presented towards the base of the lug or ear 44 and when the link is swung to the vertical position this tooth has frictional binding engagement with the base of the ear and serves to secure the link in thhe vertical position. As the link and the portion of the lever between the pivot 42 and the upper end of the link move past a dead center when the lever is swung upwardly, the cross bar will be firmly held in raised position.

When the improved sandwich cooker is in use, the front section of the body is released and swung downwardly to a reclining position and the cross bar is shifted to an elevated position. Dough is poured into the recesses of the movable section and this section then swung upwardly to a closed position against the recessed face of the stationary section. The dough flows towards the bottoms of the chambers formed by the registering recesses of the two sections and when the cross bar is shifted downwardly to move the cores into the chambers through the open upper ends thereof, the dough will be evenly distributed in the chambers about the cores. The heated cores and walls of the chambers will cook the dough and form a crisp bun of waffle-like consistency having an axially extending pocket in which a filling will be placed. After the bun has been fully cooked the cross bar is again shifted upwardly to move the cores out of the chambers and the movable front section can be released and swung downwardly to a lowered position and the cooked buns removed. The fact that the chambers are disposed vertically during cooking permits steam to rise easily and pass out through the steam outlets 19 and there will be no danger of portions of the bun being soggy due to steam being confined in the chambers during cooking of the dough. A switch 46 is provided at the front of the base for turning the current on or off and there has also been provided a signal light 47 to indicate when the current is turned on and the cooker hot.

Having thus described the invention, what is claimed as new is:

1. In a device of the character described, a body extending vertically and having companion sections, one section being stationary and the other being movable towards and away from the stationary section, confronting faces of said sections being formed with recesses registering to form dough receiving chambers open at their upper ends, a bridge shiftable vertically over said body, cores depending from said bridge and movable vertically therewith into and out of the chambers axially thereof in spaced relation to walls of the chambers, an operating lever pivoted intermediate its length to said bridge, a link having one end pivoted to said lever and its other end pivoted to the stationary section and having a portion adapted to frictionally engage the stationary section and hold the bridge in its raised position with the cores out of the chambers, and means for heating the cores and said sections to cause cooking of dough in the chambers about the cores and form cooked shells each having a longitudinally extending pocket open at one end.

2. In a device of the character described, a body having a vertically extending stationary section and a movable section mounted for movement from a reclining position to a vertical position against the stationary section, confronting faces of the sections being provided with recesses registering to form a dough-receiving chamber open at its upper end, one section being formed at the top of its recess with an opening constituting a steam outlet, a core for extending into the chamber through the open upper end thereof, actuating means for moving said core into and out of said chamber, and means for heating the core and said sections.

3. In a device of the character described, a body having a vertically extending stationary section and a movable section mounted for movement from a reclining position to a vertical position against the stationary section, confronting faces of the sections being provided with recesses registering to form a dough-receiving chamber open at its upper end, a core for extending into the chamber through the open upper end thereof, a mounting for said core disposed over the stationary section and shiftable vertically to move the core into and out of said chamber, an operating lever pivoted intermediate its length to said mounting intermediate the ends thereof, a link having one end pivoted to said lever and its other end pivoted to the stationary section, and means for heating the core and said sections.

4. In a device of the character described, a body having a vertically extending stationary section and a movable section mounted for movement from a reclining position to a vertical position against the stationary section, confronting faces of the sections being provided with recesses registering to form a dough-receiving chamber open at its upper end, a core for extending into the chamber through the open upper end thereof, a bar carrying said core and disposed above said stationary section, supporting posts for said bar slidably mounted and shiftable vertically to move the core into and out of said chamber, and means for heating the core and said sections.

5. In a device of the character described, a body having a vertically extending stationary section and a movable section mounted for movement from a reclining position to a vertical position against the stationary section, confronting faces of the sections being provided with recesses registering to form a dough-receiving chamber open at its upper end, a core for extending into the chamber through the open upper end thereof, a bar carrying said core and disposed above said stationary section, tubular supports for said stationary section, posts for said bar in telescoping engagement with said tubular supports and mounting the bar for vertical movement to shift the core into and out of said chamber, and means for heating the core and said sections.

6. In a device of the character described, a base, tubular posts rising from said base, a body having a stationary section and a movable section, the stationary section being mounted above the base between the posts and the movable section being hinged along its lower edge to the lower edge of the stationary section for swinging movement upwardly from a lowered open position to a closed position against the stationary section, confronting faces of the sections being formed with recesses registering to form chambers open at their upper ends when the movable section is closed, a cross bar over the stationary section having depending arms at its ends slidably engaged in said posts, cores depending from said cross bar for entering the chambers through the open upper ends thereof and extending longitudinally in the chamber in spaced relation to walls thereof, operating means carried by the stationary section and the cross bar for shifting the cross bar vertically and moving the cores into and out of the chambers, and means for heating the cores and said sections.

7. The structure of claim 6 wherein the operating means for the cross bar consists of a lever pivoted intermediate its length to the rear edge face of the cross bar intermediate ends thereof, and a link having one end pivoted to the lever and its other end pivoted to the stationary section intermediate the width thereof.

8. The structure of claim 6 wherein the movable section is provided with operating means consisting of a handle having forks straddling the movable section and provided with arms pivoted to side edge faces of the movable section, said arms projecting beyond the movable section and formed with hooks having upwardly extending bills, and the stationary section being provided with lugs engageable by the hooks for releasably holding the movable section in the closed position.

9. The structure of claim 6 wherein a tube extends axially through each arm of the cross bar in insulated relation thereto with its upper end provided with a terminal for the heating means for the cores, and a conductor rod extending axially through each sleeve in insulated relation to the companion post and provided with resilient contacts engaging the companion sleeve.

LEO SHUMAN.